(12) United States Patent
Park et al.

(10) Patent No.: US 9,006,594 B2
(45) Date of Patent: Apr. 14, 2015

(54) COMBINATION SWITCH DEVICE FOR CLUTCH PEDAL OF VEHICLE

(71) Applicant: Hyundai Motor Company, Seoul (KR)

(72) Inventors: Dae Deuk Park, Gyeonggi-do (KR); Deok Ki Kim, Gyeonggi-do (KR); Ki Jong Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 134 days.

(21) Appl. No.: 13/846,500

(22) Filed: Mar. 18, 2013

(65) Prior Publication Data
US 2014/0174894 A1    Jun. 26, 2014

(30) Foreign Application Priority Data
Dec. 24, 2012 (KR) .................. 10-2012-0152305

(51) Int. Cl.
| | |
|---|---|
| H01H 3/14 | (2006.01) |
| B60W 10/04 | (2006.01) |
| B60K 23/02 | (2006.01) |
| B60W 10/02 | (2006.01) |
| B60W 10/06 | (2006.01) |
| B60W 30/18 | (2012.01) |

(52) U.S. Cl.
CPC .............. *B60K 41/225* (2013.01); *B60K 23/02* (2013.01); *B60W 10/02* (2013.01); *B60W 10/06* (2013.01); *B60W 30/18181* (2013.01); *B60W 30/1819* (2013.01)

(58) Field of Classification Search
USPC .... 200/61.89, 83 R, 83 Q, 83 P, 83 S, 83 SA, 200/61.5, 286, 287, 295, 296, 331
See application file for complete search history.

(56) References Cited

U.S. PATENT DOCUMENTS

| | | | | |
|---|---|---|---|---|
| 6,781,073 | B1 * | 8/2004 | Altmann et al. | 200/61.89 |
| 6,919,520 | B2 * | 7/2005 | Kasakawa et al. | 200/61.89 |
| 8,053,690 | B2 * | 11/2011 | Jang | 200/61.89 |
| 8,592,701 | B2 * | 11/2013 | Lee et al. | 200/61.89 |

FOREIGN PATENT DOCUMENTS

| | | |
|---|---|---|
| KR | 10-2006-0130289 A | 12/2006 |
| KR | 10-2011-0081402 A | 7/2011 |
| KR | 10-2012-0062445 | 6/2012 |
| KR | 10-2012-0062445 A | 6/2012 |

* cited by examiner

*Primary Examiner* — Edwin A. Leon
(74) *Attorney, Agent, or Firm* — Mintz Levin Cohn Ferris Glovsky and Popeo, P.C.; Peter F. Corless

(57) ABSTRACT

A combination switch device for a clutch pedal of a vehicle in which functions of a clutch switch and an ignition-lock switch are combined and in which electrical contact action is carried out by a slide motion.

10 Claims, 9 Drawing Sheets

COMBINATION SWITCH DEVICE FOR CLUTCH PEDAL OF VEHICLE

CROSS-REFERENCE

This application claims priority under 35 U.S.C. §119 to Korean Patent Application No. 10-2012-0152305 filed on, Dec. 24, 2012, the disclosure of which is hereby incorporated by reference in its entirety.

BACKGROUND

1. Field of the Invention

The present invention relates, in general, to a combination switch device for a clutch pedal of a vehicle and, more particularly, to a combination switch device for a clutch pedal of a vehicle in which a clutch switch and an ignition-lock switch are integrated into a single switch.

2. Description of the Related Art

Generally, as shown in FIG. 1, drivers of manual-shift vehicles actuate a clutch using a clutch pedal 1, to which a clutch switch 2 and an ignition-lock switch 3 are separately attached. The clutch switch 2 serves to control both initial starting acceleration and operability during deceleration/acceleration and driving, and the ignition-lock switch 3 serves to prevent the starting of a vehicle when a driver does not step on the clutch pedal.

Here, the clutch switch 2 is operated so that, when a driver is not stepping on the pedal, that is, the pedal is in an idle state, contact points are brought into contact with each other, maintaining an ON state, and when the driver steps on the pedal thereby turning the switch at a certain angle, the contact points are separated away from each other, entering an OFF state. That is, in a normal closed state, the clutch switch 2 opens at a stroke of about 50%.

In addition, the ignition-lock switch 3 is operated such that, when a driver is not stepping on the pedal, that is, the pedal is in an idle state, contact points are separated away from each other, maintaining an OFF state, and when the driver steps on the pedal thereby turning the switch to a certain angle, the contact points are brought into contact with each other, entering an ON state. That is, in a normal open state, the ignition-lock switch 3 closes at a stroke of about 85%.

As can be seen from FIG. 1, M1 indicates an idle state when a driver is not stepping on the pedal 1, M2 is the operation state at a stroke of 50%, and M3 is the operation state at a stroke of 85%.

However, such a conventional clutch structure has drawbacks in that the clutch switch 2 and the ignition-lock switch 3 are mounted separately, thereby causing the structure to be complicated and thus increasing the manufacturing cost, generating operation noise upon striking a switch, and inducing contact error due to the contamination of contact points that are exposed to the outside.

The description regarding the related art is provided only for understanding of the background of the invention, so it should not be construed by ordinarily skilled persons in the art to be admitted to be the related art.

SUMMARY

Accordingly, the present invention has been made keeping in mind the above problems occurring in the related art, and the present invention is intended to propose a combination switch device for a clutch pedal of a vehicle, which can simultaneously perform functions of a clutch switch and an ignition-lock switch, contributing to a simplified structure, cost savings, weight reduction, noise reduction through sliding contact, and prevention of contact error caused by foreign matter-contamination by shielding contact points.

In order to achieve the above object, according to one aspect of the present invention, there is provided a combination switch device for a clutch pedal of a vehicle, including: a housing fixedly mounted to a pedal member; a stationary terminal fixedly coupled to one side of the housing and having a clutch switch terminal and an ignition-lock switch terminal; a plunger rotatably mounted to the housing, facing the stationary terminal; a movable terminal fixedly mounted to one side of the plunger, facing the stationary terminal, and having a contact point for electrical connection with the stationary terminal; and a power transmitter connecting the plunger and the clutch pedal together such that the plunger turns as the clutch pedal turns.

The combination switch device may further include a shield to cover the plunger so as to prevent foreign matter from entering a space in which the stationary terminal is mounted, the shield including an upper cover fixedly coupled to one side of the housing and a lower cover coupled to the other side of the housing.

The power transmitter may include a switch lever having a lever shaft passing through the lower cover and the housing and being integrally coupled to the plunger, and a pedal pin protruding from one side of the clutch pedal so that a leading end thereof is integrally coupled with the switch lever. The combination switch device may further include a spring, both ends of which are supported by the lower cover and the switch lever so as to elastically support the lower cover.

The clutch switch terminal may consist of a positive clutch switch terminal and a ground clutch switch terminal respectively having clutch switch contacts at 180° intervals, the clutch switch contacts being electrically connected with the contact point of the movable terminal unit.

The ignition-lock switch terminal may consist of a positive ignition-lock switch terminal and a negative ignition-lock switch terminal. The positive ignition-lock switch terminal may be disposed between the positive clutch switch terminal and the ground clutch switch terminal, and the negative ignition-lock switch terminal may be disposed in the side of the ground clutch switch terminal. The positive and negative ignition-lock switch terminals respectively may have ignition-lock switch contacts at 180° intervals. The ignition-lock switch contacts may be electrically connected with the contact point of the movable terminal, and the ignition-lock switch contacts may be disposed between the clutch switch contacts.

The contact point of the movable terminal may consist of a plurality of contact points in order to enhance connectivity, the contact points being disposed in a row so as to be arranged with the clutch switch contacts and the ignition-lock switch contacts.

According to the present invention, a combination switch device for a clutch pedal of a vehicle can simultaneously perform functions of a clutch switch and an ignition-lock switch, contributing to a reduction in the number of parts, cost saving, weight reduction, noise reduction through sliding contact, and prevention of contact error caused by foreign matter-contamination of contact points.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
FIG. 1 is a view of a conventional clutch pedal for a vehicle in which a clutch switch and an ignition-lock switch are separately mounted.

Reference will now be made in greater detail to a preferred embodiment of the invention, an example of which is illustrated in the accompanying drawings. Wherever possible, the same reference numerals will be used throughout the drawings and the description to refer to the same or like parts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 2:
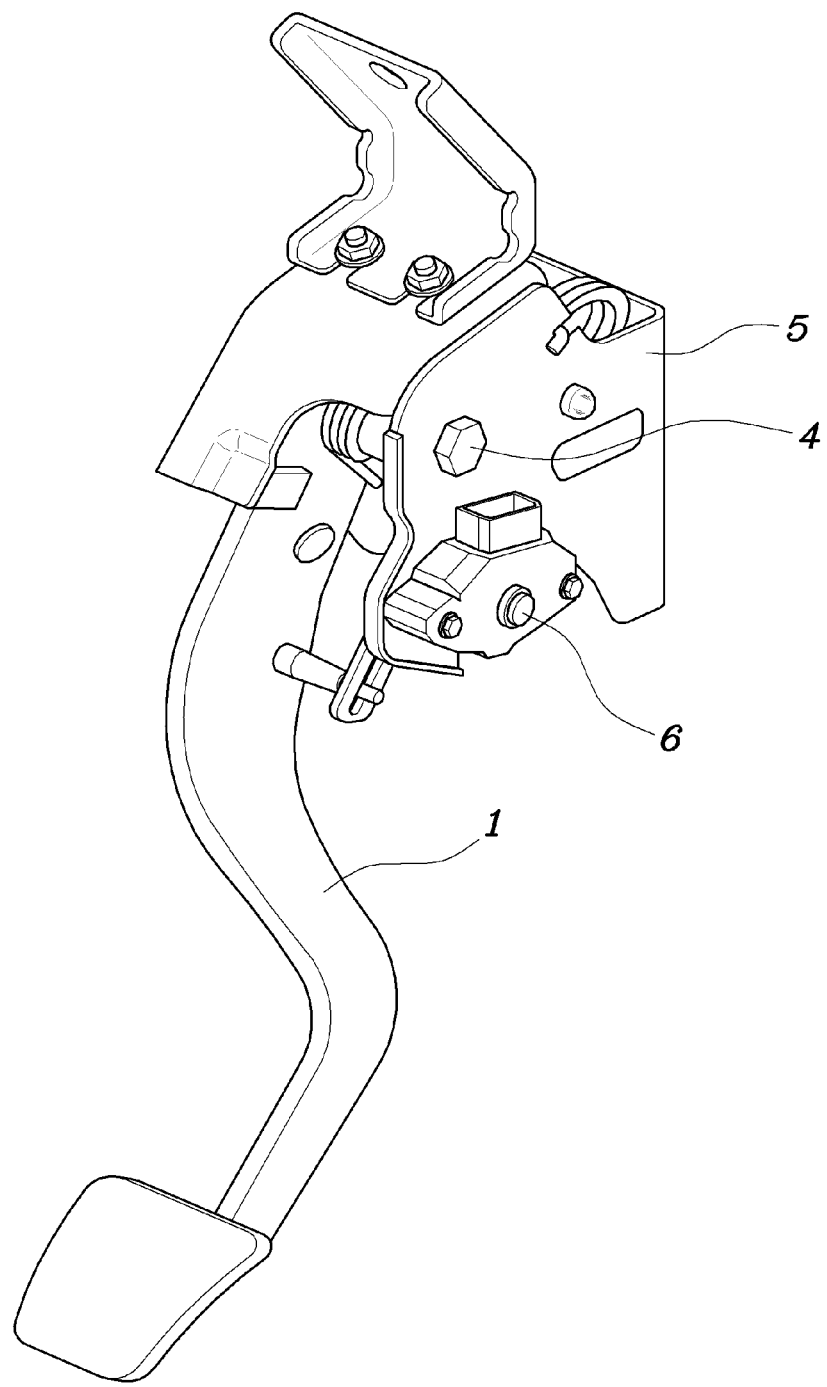
FIG. 2 is a perspective view of a clutch pedal for a vehicle in which a combination clutch switch device according to the exemplary embodiment of the present invention is mounted.
Figure 3:
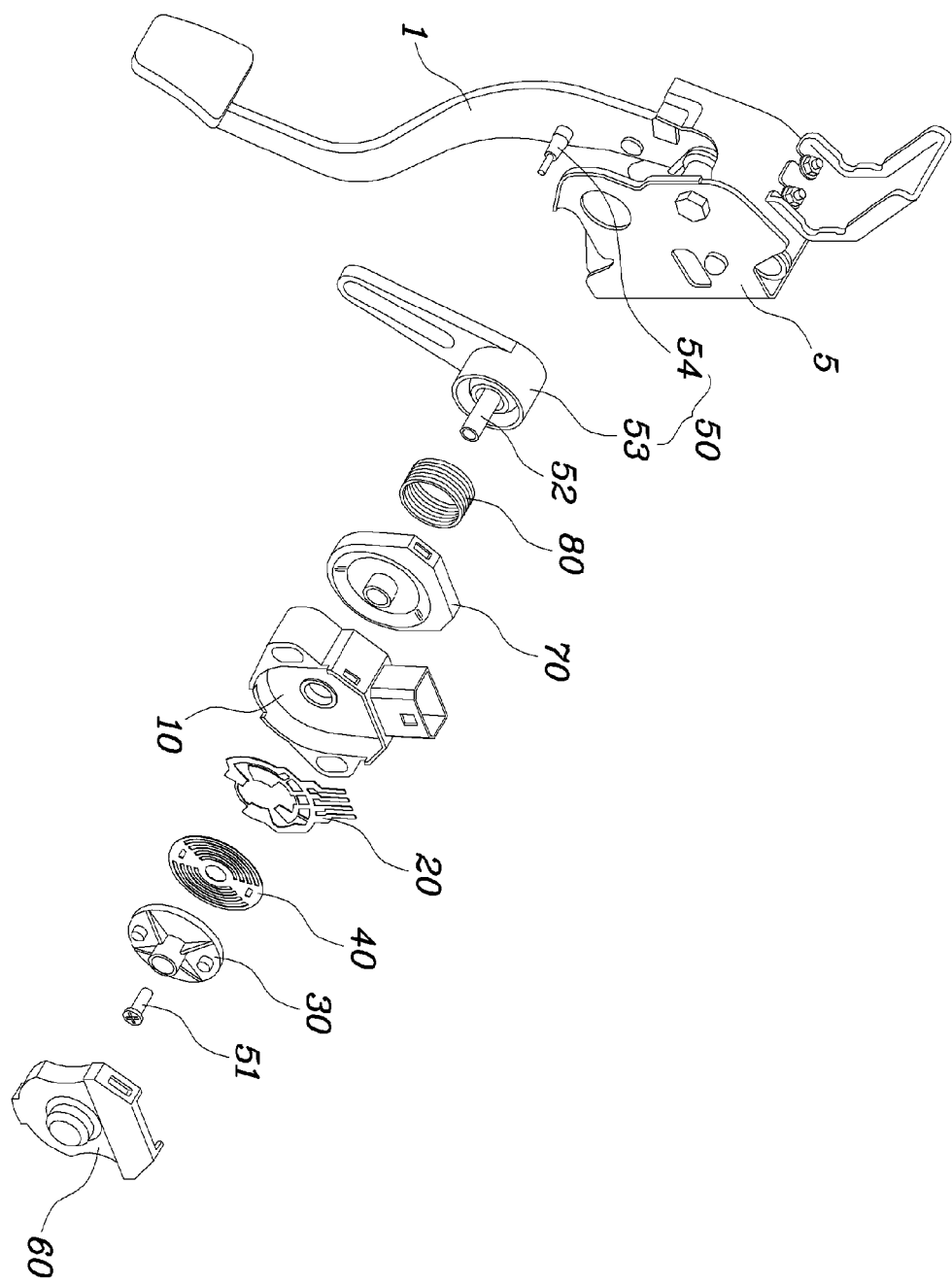
FIGS. 3 and 4 are an exploded perspective view and a assembled cross-sectional view of the combination switch device according to the exemplary embodiment of the present invention.
Figure 4:
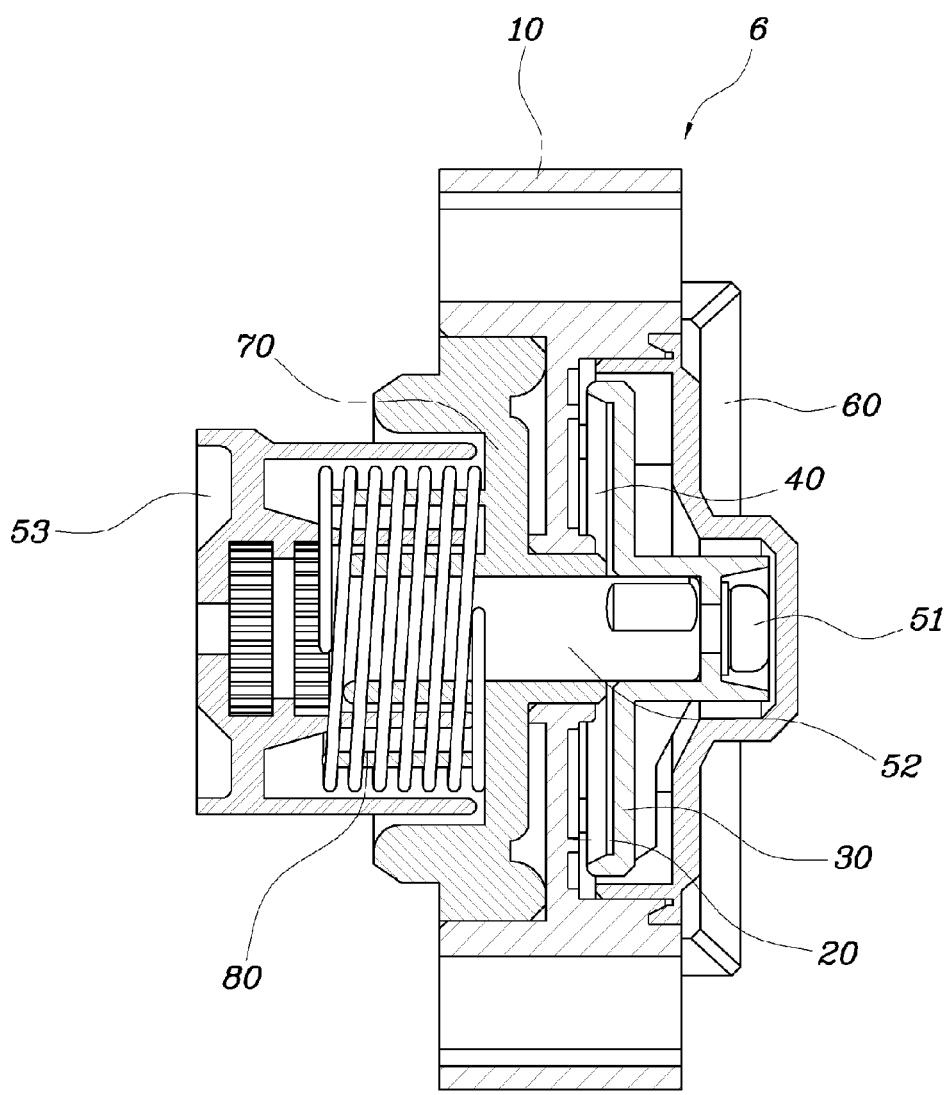

As shown in FIG. 2, a clutch pedal 1 for a vehicle is configured so that an upper portion thereof is coupled to a pedal member 5 so as to be rotated about a hinge bolt 4. The pedal member 5 is fixedly coupled to a vehicle body panel under an instrument panel.

A combination switch device 6 for a clutch pedal of a vehicle according to exemplary embodiment of the present invention is a switch device in which a clutch switch and an ignition-lock switch, which in conventional designs are separately provided in the clutch pedal, are integrated into a single switch. The combination switch device includes a housing 10 which is fixedly mounted to one side of the pedal member 5, a stationary terminal 20 which is fixedly coupled to one side of the housing 10 and which includes a clutch switch terminal 21 and an ignition-lock switch terminal 22, a plunger 30 which is rotatably mounted to the housing 10, facing the stationary terminal 20, a movable terminal 40 which is fixedly mounted to one side of the plunger 30, facing the stationary terminal 20, and which has a contact point 41 for electrical connection with the stationary terminal 20, and a power transmitter 50 which connects the plunger 30 and the clutch pedal 1 together so that the plunger 30 turns as the clutch pedal 1 moves.

The combination switch device 6 further includes a shield which covers the plunger 30 to prevent foreign matter from entering a space in which the stationary terminal 20 is mounted. The shield may include an upper cover 60 which is fixedly coupled to one side of the housing 10, and a lower cover 70 which is coupled to the other side of the housing 10.

Here, the power transmitter 50 may include a switch lever 53 which includes a lever shaft 52 passing through the lower cover 70 and the housing 10 and is integrally coupled to the plunger 30 by means of a, e.g., a bolt 51, and a pedal pin 54 which protrudes from one side of the clutch pedal 1 so that a leading end thereof is integrally coupled with the switch lever 53.

Further, the combination switch device 6 may further include a spring 80, both ends of which are supported by the lower cover 70 and the switch lever 53 so as to elastically support the lower cover 70. The support force of the spring 80 prevents a gap from being created between the housing 10 and the lower cover 70, thereby having the effect of ensuring the smooth operation of the combination switch device 6.

Figure 5:
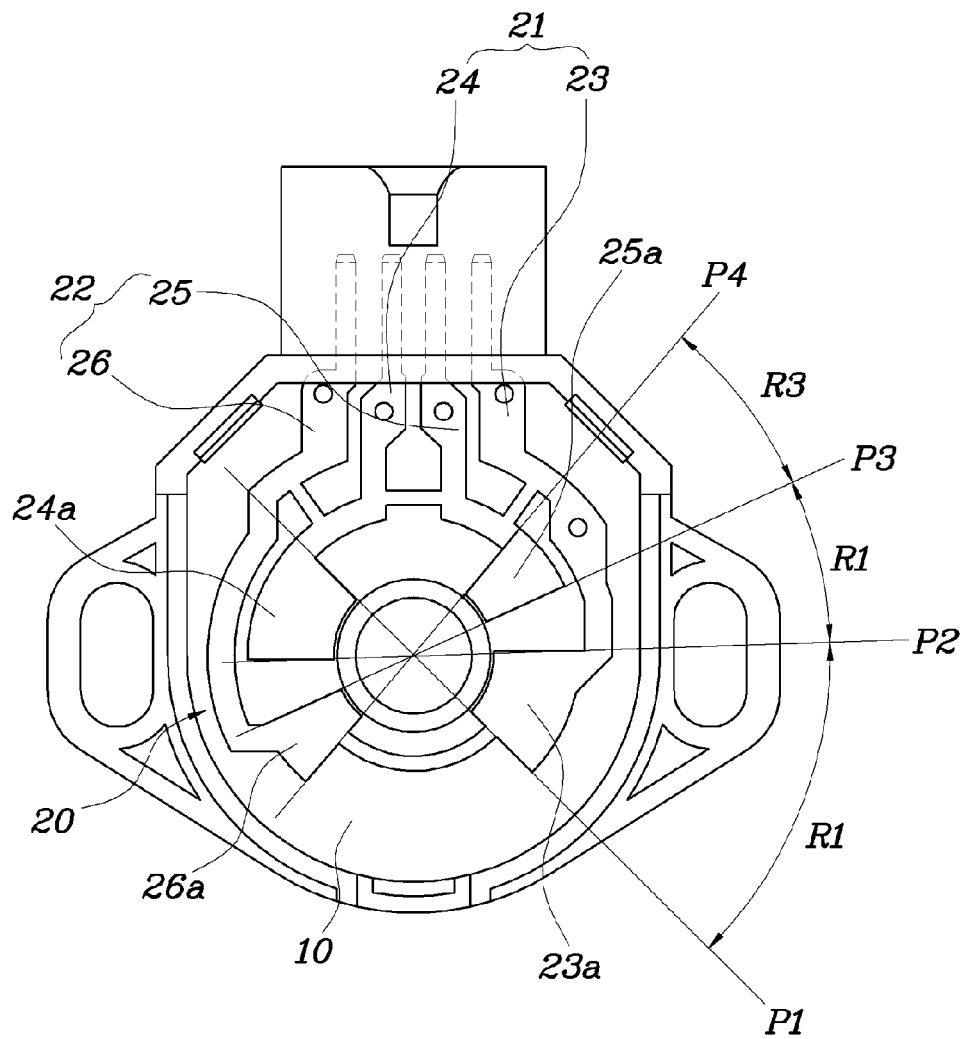
FIGS. 5 and 6 are views of a stationary terminal and a movable terminal in the combination switch device according to the exemplary embodiment of the present invention.
Figure 6:
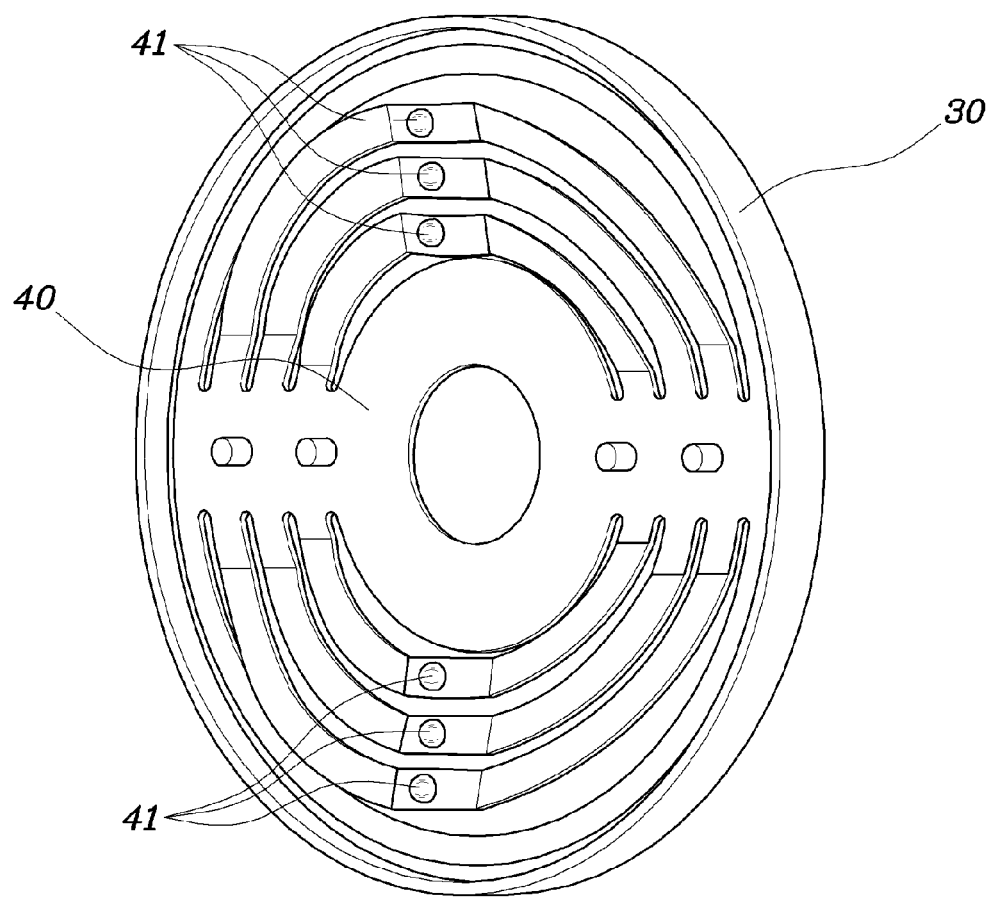

Meanwhile, as shown in FIG. 5, the clutch switch terminal 21 may consist of a positive clutch switch terminal 23 and a ground clutch switch terminal 24 which respectively have clutch switch contacts 23a and 24a at 180° intervals. The clutch switch contacts 23a and 24a may be electrically connected with the contact point 41 of the movable terminal 40.

The ignition-lock switch terminal 22 consists of a positive ignition-lock switch terminal 25 and a negative ignition-lock switch terminal 26. The positive ignition-lock switch terminal 25 is disposed between the positive clutch switch terminal 23 and the ground clutch switch terminal 24. The negative ignition-lock switch terminal 26 is disposed in the side of the ground clutch switch terminal 24. The positive and negative ignition-lock switch terminals 25 and 26 respectively have ignition-lock switch contacts 25a and 26a at 180° intervals. The ignition-lock switch contacts 25a and 26a may be electrically connected with the contact point 41 of the movable terminal 40. The ignition-lock switch contacts 25a and 26a may be disposed between the clutch switch contacts 23a and 24a. That is, the ignition-lock switch contact 25a may be disposed at a first location that is separated by a certain distance away from the clutch switch contact 23a in the rotary direction of the plunger 30 which is coupled to the housing 10. Subsequently, the clutch switch contact 24a may be disposed at a second location separated by a certain distance from the first location. The ignition-lock switch contact 26a may be disposed at a location apart by a certain distance from the second location.

Further, the contact point 41 of the movable terminal 40 preferably consists of a plurality of contact points 41 for enhancement of connectivity. The contact points may be disposed in a row for arrangement with the clutch switch contacts 23a and 24a and the ignition-lock switch contacts 25a and 26a.

Now, the operation of the combination switch device according to embodiments of the invention will be described.

Figure 7:
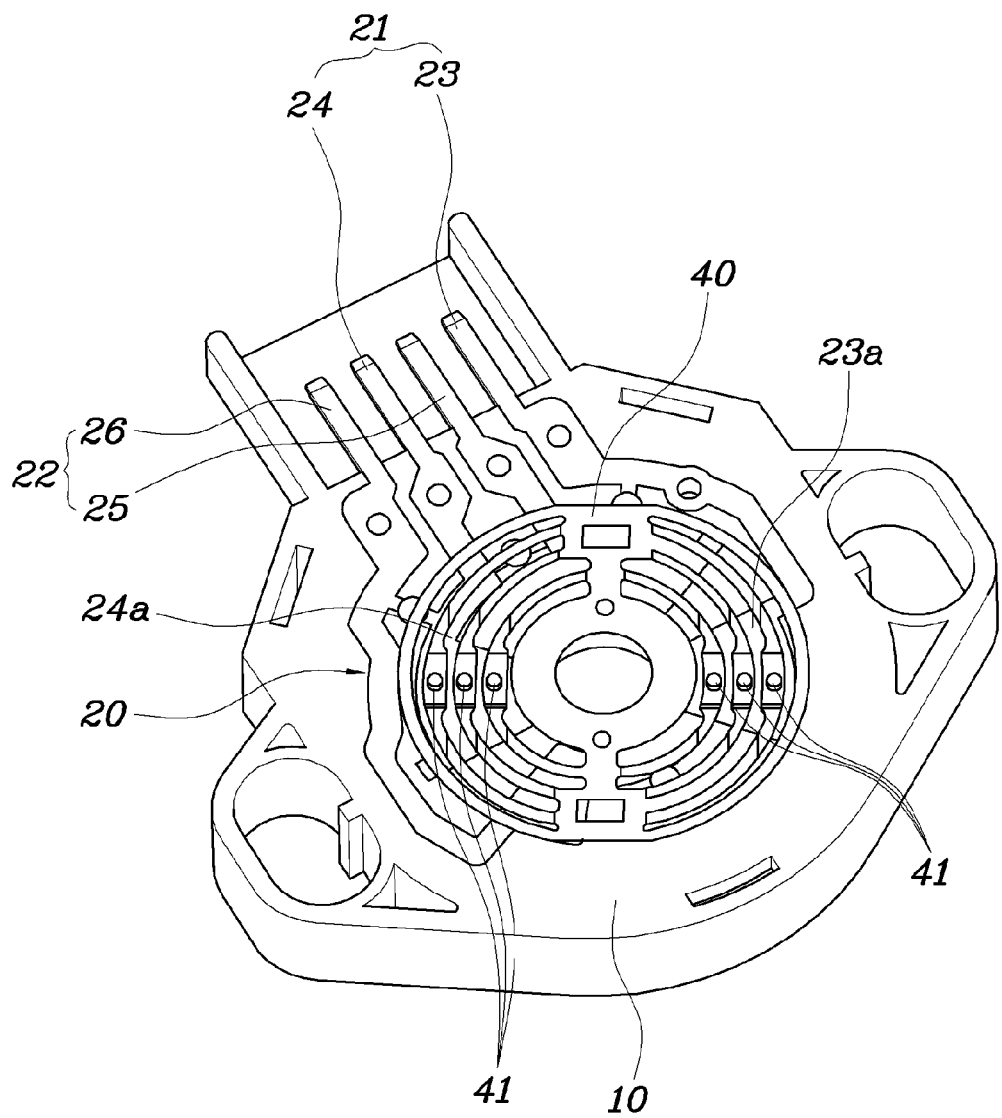
FIGS. 7 to 9 are views showing the operation of the combination switch device according to the exemplary embodiment of the present invention.

In FIG. 5, a location P1 indicates a location in an idle state when a driver is not stepping on the clutch pedal 1, a location P2 is a location in the operation state at a stroke of 50% when the pedal is being pressed down, a location P3 is a location in the operation state at a stroke of 85% when the pedal is being pressed down, and a location P4 is a location in the operation state at a full stroke when the pedal is being pressed down. Thus, in the idle state when a driver is not stepping on the pedal or until about a 50% pedal stroke, the contact points 41 of the movable terminal 40 are located in a section R1 between P1 and P2, thereby coming into contact with the clutch switch contacts 23a and 24a as shown in FIG. 7. Here, the clutch switch terminal 21 is in an ON state, and the ignition-lock switch terminal 22 is in an OFF state, so that the combination switch device 6 of the invention functions as a clutch switch.

Figure 8:
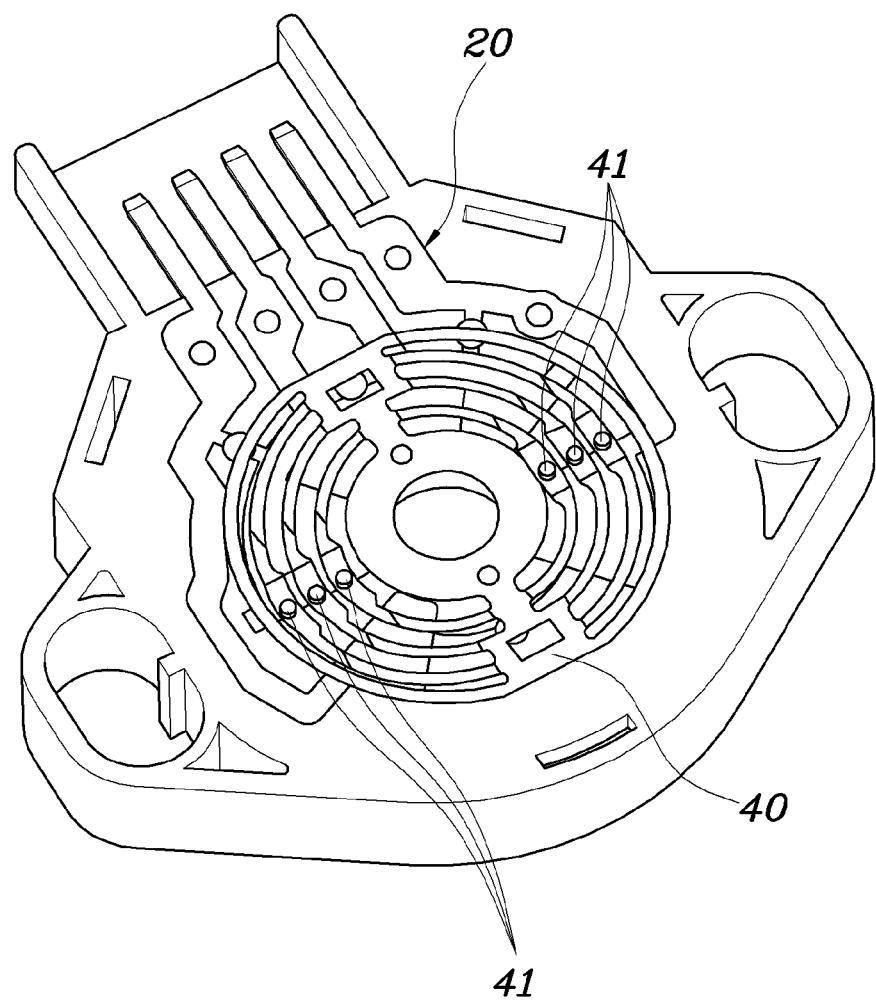

In addition, when a driver steps on the pedal 1 further, and as shown in FIG. 8, the contact points 41 of the movable terminal 40 are located in a section R2 between the P2 and P3 (in a section at a 50-85% pedal stroke), the contact points 41 of the movable terminal 40 are neither in contact with the clutch switch contacts 23a and 24a nor the ignition-lock switch contacts 25a and 26a, so the combination switch device of the invention is in the state in which each of the clutch switch terminal 21 and the ignition-lock switch terminal 22 are in an OFF state.

Figure 9:
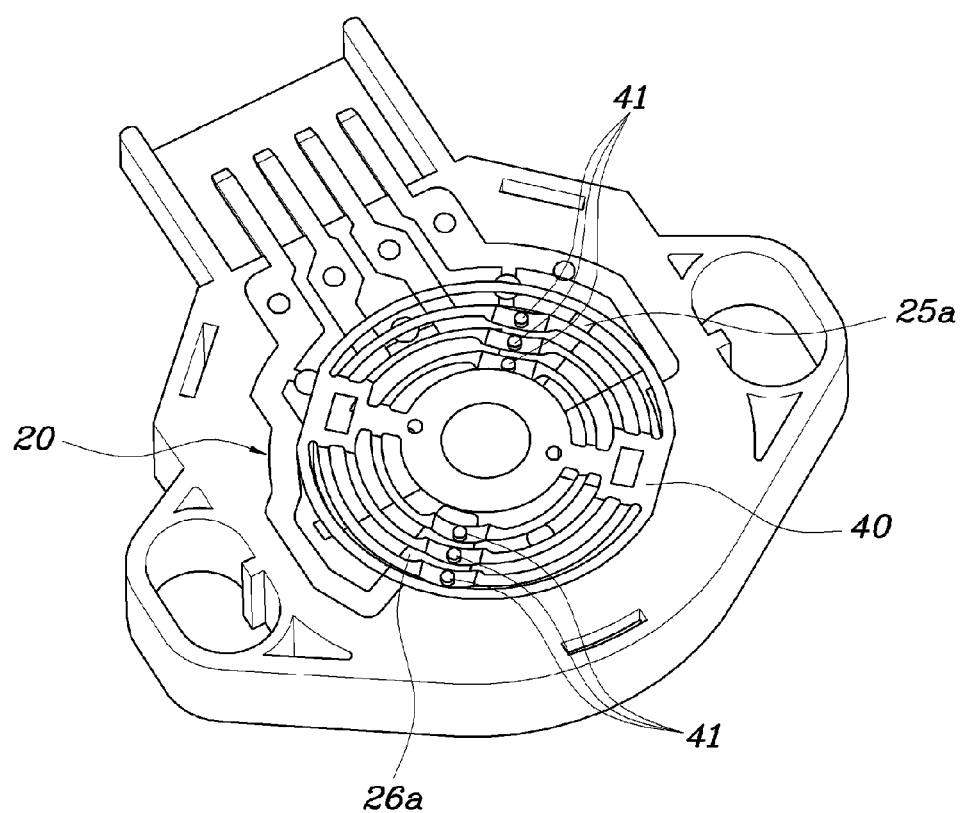

Further, when a driver steps on the pedal 1 even further, and as shown in FIG. 9, the contact points 41 of the movable terminal 40 are located in a section R3 between P3 and P4 (in a section at a 85% to full pedal stroke), the contact points 41 of the movable terminal 40 are brought into contact with the ignition-lock contacts 25a and 26a. Here, the clutch switch terminal 21 continuously maintains an OFF state, and the ignition-lock switch terminal 22 enters an ON state, so that the combination switch device of the invention functions as an ignition-lock switch.

As set forth before, the combination switch device 6 of the invention establishes a single switch in which functions of a clutch switch and an ignition-lock switch are integrated, thereby having advantages such as a reduction in the number of parts and weight, and a saving on cost, as compared with a conventional structure in which a clutch switch and an ignition-lock switch are separated constructed.

Further, the combination switch 6 of the invention is configured such that the contact points 41 of the movable terminal 40 come into contact with the terminals 21 and 22 of the stationary terminal 20 in a sliding motion, thereby having the advantage of reduced operation noise as compared with a conventional structure in which the contact points come into contact with the contacts in a striking method.

Still further, the combination switch device 6 of the invention has the structure in which the stationary terminal 20 and the movable terminal 40 are not exposed to the outside, but shielded by covers 60 and 70, thereby having the advantage of preventing contamination of contact points due to foreign matter and thus preventing contact error due to the contamination.

Furthermore, the combination switch device 6 of the invention has an advantage in that it is commonly applicable to relevant products irrespective of the kind of target vehicles and target clutch pedals.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A combination switch device for a clutch pedal of a vehicle, comprising:
    a housing fixedly mounted to a pedal member;
    a stationary terminal fixedly coupled to one side of the housing and having a clutch switch terminal and an ignition-lock switch terminal;
    a plunger rotatably mounted to the housing, facing the stationary terminal unit;
    a movable terminal fixedly mounted to one side of the plunger, facing the stationary terminal, and having a contact point for electrical connection with the stationary terminal; and
    a power transmitter connecting the plunger and the clutch pedal together such that the plunger turns as the clutch pedal moves.

2. The combination switch device according to claim 1, further comprising a shield to cover the plunger preventing foreign matter from entering a space in which the stationary terminal is mounted, the shield including:
    an upper cover fixedly coupled to one side of the housing; and
    a lower cover coupled to the other side of the housing.

3. The combination switch device according to claim 2, wherein the power transmitter includes:
    a switch lever having a lever shaft passing through the lower cover and the housing, and being integrally coupled to the plunger; and
    a pedal pin protruding from one side of the clutch pedal so that a leading end thereof is integrally coupled with the switch lever.

4. The combination switch device according to claim 3, further comprising a spring, both ends of which are supported by the lower cover and the switch lever so as to elastically support the lower cover.

5. The combination switch device according to claim 1, wherein the clutch switch terminal consists of a positive clutch switch terminal and a ground clutch switch terminal respectively having clutch switch contacts at 180° intervals, the clutch switch contacts being electrically connected with the contact point of the movable terminal.

6. The combination switch device according to claim 5, wherein the ignition-lock switch terminal consists of a positive ignition-lock switch terminal and a negative ignition-lock switch terminal.

7. The combination switch device according to claim 6, wherein the positive ignition-lock switch terminal is disposed between the positive clutch switch terminal and the ground clutch switch terminal.

8. The combination switch device according to claim 7, wherein the negative ignition-lock switch terminal is disposed in the side of the ground clutch switch terminal, wherein the positive and negative ignition-lock switch terminals respectively have ignition-lock switch contacts at 180° intervals, the ignition-lock switch contacts being electrically connected with the contact point of the movable terminal unit.

9. The combination switch device according to claim 8, wherein the ignition-lock switch contacts are disposed between the clutch switch contacts.

10. The combination switch device according to claim 9, wherein the contact point of the movable terminal consists of a plurality of contact points in order to enhance connectivity, the contact points being disposed in a row so as to be arranged with the clutch switch contacts and the ignition-lock switch contacts.

* * * * *